United States Patent
Dvonch et al.

(10) Patent No.: US 10,948,922 B2
(45) Date of Patent: Mar. 16, 2021

(54) AUTONOMOUS VEHICLE NAVIGATION

(71) Applicant: Sensors Unlimited, Inc., Princeton, NJ (US)

(72) Inventors: Curt Dvonch, Salt Lake City, UT (US); Jonathan Nazemi, Doylestown, PA (US)

(73) Assignee: Sensors Unlimited, Inc., Princeton, NJ (US)

( * ) Notice: Subject to any disclaimer, the term of this patent is extended or adjusted under 35 U.S.C. 154(b) by 588 days.

(21) Appl. No.: 15/625,752

(22) Filed: Jun. 16, 2017

(65) Prior Publication Data

US 2018/0364730 A1    Dec. 20, 2018

(51) Int. Cl.
| | |
|---|---|
| *G05D 1/02* | (2020.01) |
| *G06K 9/00* | (2006.01) |
| *G06K 9/62* | (2006.01) |
| *G06K 9/20* | (2006.01) |

(52) U.S. Cl.
CPC ......... *G05D 1/0242* (2013.01); *G05D 1/0238* (2013.01); *G05D 1/0246* (2013.01); *G06K 9/00791* (2013.01); *G06K 9/00818* (2013.01); *G06K 9/2036* (2013.01); *G06K 9/6289* (2013.01)

(58) Field of Classification Search
None
See application file for complete search history.

(56) References Cited

U.S. PATENT DOCUMENTS

| | | | | |
|---|---|---|---|---|
| 6,433,817 | B1* | 8/2002 | Guerra | G07C 1/24 |
| | | | | 348/157 |
| 8,031,062 | B2 | 10/2011 | Smith | |
| 8,593,521 | B2* | 11/2013 | Schofield | H04N 7/183 |
| | | | | 348/148 |
| 8,637,801 | B2* | 1/2014 | Schofield | G06K 9/2018 |
| | | | | 250/208.1 |
| 8,665,079 | B2* | 3/2014 | Pawlicki | G01S 11/12 |
| | | | | 340/435 |
| 8,977,008 | B2* | 3/2015 | Camilleri | B60R 1/00 |
| | | | | 382/104 |
| 9,318,021 | B2 | 4/2016 | Al-Qaneei | |
| 9,483,948 | B1 | 11/2016 | Gordon et al. | |
| 9,508,014 | B2* | 11/2016 | Lu | B32B 17/10477 |
| 9,558,409 | B2* | 1/2017 | Pliefke | G06K 9/00798 |
| 9,598,078 | B2 | 3/2017 | Moran et al. | |
| 10,027,340 | B1* | 7/2018 | Weisenberger | G01T 1/2914 |
| 2006/0088223 | A1* | 4/2006 | Matsuhira | H04N 19/60 |
| | | | | 382/233 |
| 2007/0241195 | A1* | 10/2007 | Hussey | G06K 7/10722 |
| | | | | 235/462.21 |

(Continued)

OTHER PUBLICATIONS

U.S. Appl. No. 15/266,837, filed Sep. 15, 2016, Neal et al.

*Primary Examiner* — Frederick M Brushaber
(74) *Attorney, Agent, or Firm* — Locke Lord LLP; Scott D. Wofsy; Judy R. Naamat

(57) ABSTRACT

A method of navigating an autonomous vehicle includes receiving pulsed illumination from an object in the vehicle environment and decoding the pulsed illumination. The object is identified using the decoded pulsed illumination of the pulsed illumination, and the autonomous vehicle navigated through the vehicle environment based on the identification of the object. Obstacle avoidance methods and navigation systems for autonomous vehicles are also described.

19 Claims, 3 Drawing Sheets

(56) References Cited

U.S. PATENT DOCUMENTS

| | | | |
|---|---|---|---|
| 2011/0050985 A1* | 3/2011 | Munoz Leo | H04N 5/2354 |
| | | | 348/370 |
| 2012/0305786 A1* | 12/2012 | Dierickx | G01J 1/44 |
| | | | 250/371 |
| 2015/0088373 A1 | 3/2015 | Wilkins | |
| 2016/0132705 A1 | 5/2016 | Kovarik et al. | |
| 2016/0350601 A1* | 12/2016 | Grauer | G06T 11/60 |
| 2017/0018179 A1 | 1/2017 | Gutierrez | |
| 2020/0092468 A1* | 3/2020 | Mermelstein | G06T 5/50 |

\* cited by examiner

AUTONOMOUS VEHICLE NAVIGATION

BACKGROUND OF THE INVENTION

1. Field of the Invention

The present disclosure relates to vehicle navigation, and more particularly to autonomous vehicle navigation using machine vision systems and techniques.

2. Description of Related Art

Some vehicles, such as drones and autonomous automobiles, are configured to operate in an autonomous mode in which the vehicle navigates through the vehicle environment with little or no input from an operator. Such vehicles commonly employ one or more sensors that are configured to sense information about the vehicle environment, which the vehicle may use to navigate through the environment without operator input.

The sensors generally detect light that has reflected off objects in the vehicle environment to build an image. Machine vision algorithms are then applied to the image to detect shapes such as street signs, street lights, pedestrians, other vehicles, etc., and the vehicle makes navigation, control, and obstacle avoidance decisions based on the shape information extracted from the image. For example, if the sensors determine that the vehicle is approaching a stop sign, the vehicle may initiate a braking routine such that the vehicle slows and comes to a stop during its approach to the stop sign. Such autonomous vehicles may operate in various weather and lighting conditions, such as, but not limited to, days, nights, good visibility conditions, and/or reduced visibility conditions.

Such navigation systems and methods of navigating autonomous vehicles have generally been considered satisfactory for their intended purpose. However, there is still a need in the art for improved autonomous vehicle navigation systems and methods. The present disclosure provides a solution for this need.

SUMMARY OF THE INVENTION

A method of navigating an autonomous vehicle includes receiving pulsed illumination from an object in the vehicle environment and decoding the pulsed illumination. The object is identified by decoding the pulsed illumination and the autonomous vehicle navigated through the vehicle environment based on the identification of the object.

In certain embodiments, decoding the pulsed illumination can include decoding the pulsed illumination according to frequency, wavelength, and/or intensity of the pulsed illumination. The pulsed illumination can include modulated pulsed illumination or unmodulated pulsed illumination. It is contemplated that the method can include demodulating the pulsed illumination.

In accordance with certain embodiments, the method can include generating pulse data representative of the vehicle environment using the pulsed illumination. Non-pulsed illumination can be received from the vehicle environment, and image data representative of the vehicle environment generated using the non-pulsed illumination. The pulsed and non-pulsed illumination can share a visible, short-wavelength infrared, a mid-wavelength infrared, or a long-wavelength infrared waveband. It is contemplated that identifying the object can include selecting an identity for the object using the decoded, pulsed illumination.

It is also contemplated that, in accordance with certain embodiments, the method can include enhancing the image data by inserting an object indicator in the image data. A shape recognition algorithm can be applied to the image data. The image data, enhanced with the object indicia, can be analyzed with a machine vision algorithm. A navigation command can be issued to a vehicle controller based on an analysis of image data containing the identification of the object. An image including the object indicia can be displayed on a user interface.

A method of controlling an autonomous vehicle includes receiving non-pulsed illumination from the vehicle environment, generating image data of the vehicle environment using the non-pulsed illumination, and receiving pulsed illumination from an object in the vehicle environment. The pulsed illumination is decoded, the object identified using the decoded pulsed illumination, and an object identity is selected for the object. The image data is enhanced by inserting the object identifier into the image data and the enhanced image data analyzed using a machine vision algorithm. The autonomous vehicle is navigated through the vehicle environment based on the identification of the object. The pulsed illumination and the non-pulsed illumination are in a common visible, short-wavelength infrared, a mid-wavelength infrared, or long-wavelength infrared waveband.

A navigation system for navigating an autonomous vehicle through an external vehicle environment having objects external to the autonomous vehicle includes a sensor for receiving pulsed illumination from objects the in vehicle environment, a decoder, an object identifier, and a controller. The decoder is in communication with the sensor for decoding pulsed illumination received from the environment. The object identifier is in communication with the decoder for identifying objects in the vehicle environment by decoding received pulsed illumination. The controller is in communication with the object identifier and is operatively connected to the autonomous vehicle for navigating the autonomous vehicle through the vehicle environment based on the identification of the object.

In certain embodiments the pulse detection imaging sensor can be configured to generate pulse data and image data from incident illumination received from the external environment. The sensor can be configured to generate pulse data and image data using incident illumination in a common visible waveband, a short-wavelength-infrared waveband, a mid-wavelength infrared waveband, or a long-wavelength waveband. The sensor can acquire the pulse data in spatial registration with the image data.

In accordance with certain embodiments the system can include a lookup table having a plurality of decoded pulsed illumination/object associations. The object identifier is disposed in communication with the lookup table for identifying the object based upon an object association with the decoded pulsed illumination. The decoded pulsed illumination/object associations can include one or more decoded pulsed illumination/traffic control device object association, decoded pulsed illumination/vehicle identity association, and decoded pulsed illumination/non-traffic control device and non-vehicle identity object. The decoded pulsed illumination/object associations can include one or more intensity/traffic control device object association, intensity/vehicle identity association, and intensity/non-traffic control device and non-vehicle identity object association. The decoded pulsed illumination/object associations can include one or more of a wavelength/traffic control device object, a wavelength/vehicle identity, and a wavelength/non-traffic control device and non-vehicle identity object association.

It is also contemplated that the navigation system can include a machine vision algorithm. The machine vision algorithm can be in communication with the object identifier and configured to generate navigation commands based on object identifications. An image data enhancer in communication with the sensor, the object identifier, and the machine vision algorithm to enhance the image data received from the sensor with an object indicia received from the object identifier for providing enhanced image data to the machine vision algorithm.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
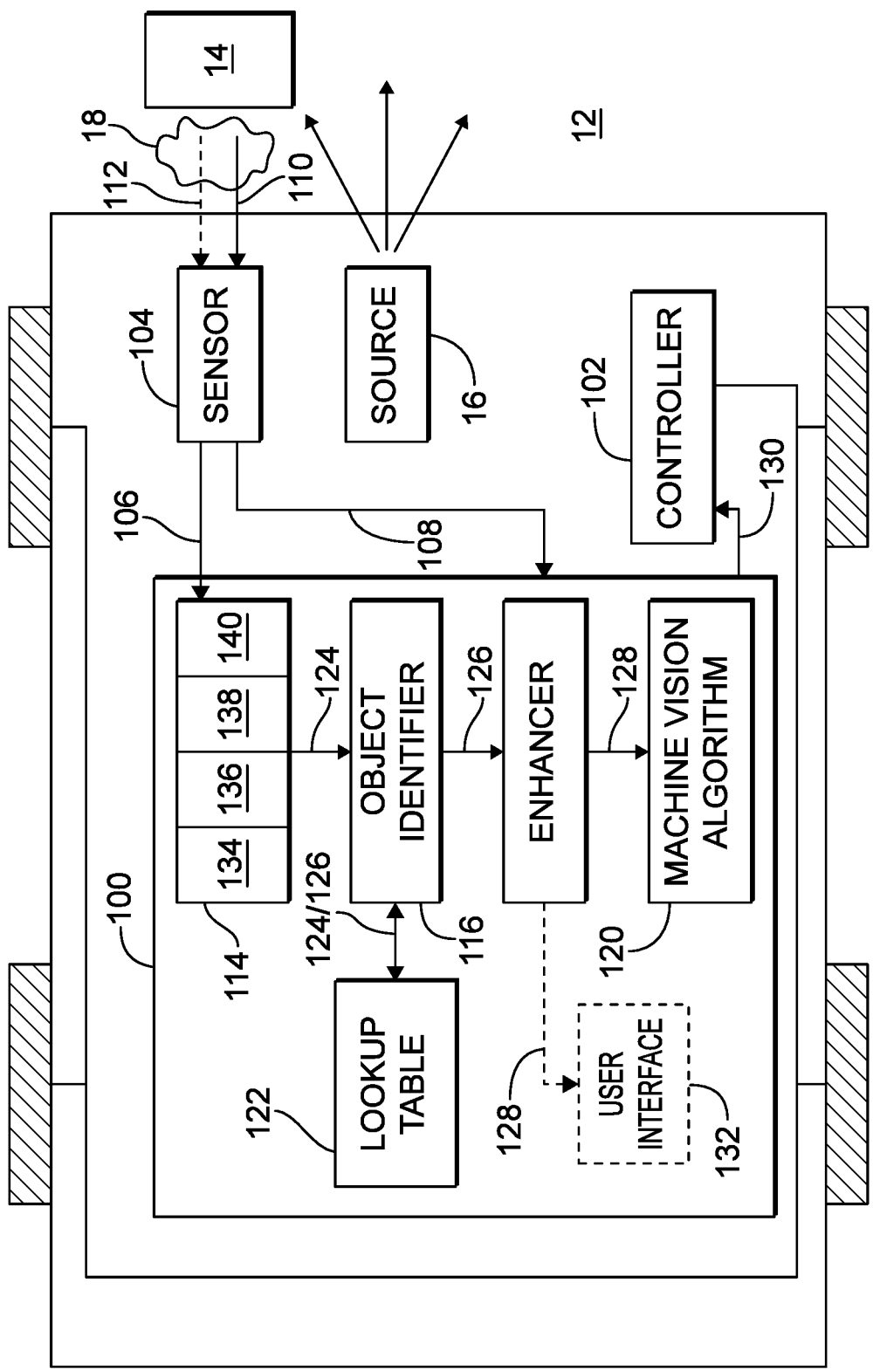
FIG. 1 is a schematic view of an exemplary embodiment of a navigation system for an autonomous vehicle constructed in accordance with the present disclosure, showing a sensor disposed in communication with the navigation system.

Reference will now be made to the drawings wherein like reference numerals identify similar structural features or aspects of the subject disclosure. For purposes of explanation and illustration, and not limitation, a partial view of an exemplary embodiment of a navigation system in accordance with the disclosure is shown in FIG. 1 and is designated generally by reference character 100. Other embodiments of navigation systems, methods of navigating autonomous vehicles, and methods of controlling autonomous vehicles in accordance with the disclosure, or aspects thereof, are provided in FIGS. 2 and 3, as will be described. The systems and methods described herein can be used in autonomous vehicles, such as automobiles, though the present disclosure is not limited automobiles or to autonomous vehicles in general.

Referring to FIG. 1, an autonomous vehicle 10 is shown. Autonomous vehicle 10 includes navigation system 100, a controller 102, and a sensor 104. Navigation system 100 is arranged for navigating an autonomous vehicle 10 through the vehicle environment 12. Vehicle environment 12 has one or more object 14 disposed therein which are external to autonomous vehicle 10. Examples of the one or more object 14 include traffic control devices, pedestrians, obstacles, and vehicles by way of non-limiting example. In an exemplary embodiment object 14 is a road sign equipped with a light-emitting-diode (LED) light source.

Sensor 104 includes a pulse detection imaging sensor that is configured to generate pulse data 106 and image data 108. Image data 108 is generated from non-pulsed illumination 110 received from vehicle environment 12 and/or object 14 disposed within vehicle environment 12. Pulse data 106 is generated from pulsed illumination 112 received from vehicle environment 12, e.g., actively emitted (or reflected from) object 14. In certain embodiments pulsed illumination 112 is visible waveband illumination emitted from a traffic control device, such as a traffic light or active signage. In accordance with certain embodiments, pulsed illumination 112 is visible waveband illumination passively reflected from object 14, such as illumination projected from a light source 16 carried by autonomous vehicle 10. It is also contemplated that either (or both) non-pulsed illumination 110 and/or pulsed illumination 112 can be illumination in a common infrared waveband, e.g., a shortwave-infrared waveband, a near-infrared waveband, or a longwave-infrared waveband. As will be appreciated by those of skill in the art in view of the present disclosure, infrared wavebands experience less attenuation from obscurants 18, e.g., fog, haze, and/or precipitation, which can be present in vehicle environment 12 than visible light. Examples of suitable sensors include those described in U.S. patent application Ser. No. 15/266,837, filed Sep. 15, 2016 by the assignee of the present application, the contents of which are incorporated herein by reference in their entirety.

Controller 102 is operatively connected to a drive system 20 of autonomous vehicle 10. In the illustrated exemplary embodiment drive system 20 is an automotive drive system. This is for illustration purposes only and is non-limiting. It is contemplated that drive system 20 can be a flight control system from an unmanned aerial vehicle, a marine propulsion system for a marine vehicle, or any other type of propulsion system, as suitable for a given application.

Navigation system 100 includes a decoder 114, an object identifier 116, and an image data enhancer 118. Navigation system 100 also includes a machine vision algorithm 120 and a lookup table 122. It is contemplated that navigation system 100 have electronic circuitry, software, or a combination of circuitry and software, as suitable for an intended application, to implement decoder 114, object identifier 116, image data enhancer 118, machine vision algorithm 120, and lookup table 122.

Decoder 114 is disposed in communication with sensor 104 for receiving pulse data 106 from sensor 104. Decoder 114 can include one or more of a frequency decoder 134 arranged to determine a pulse frequency of pulsed illumination 112 incident upon sensor 104, an intensity decoder 136 arranged to determine intensity of pulsed illumination 112 incident upon sensor 104, a wavelength decoder 138 arranged to determine wavelength of pulsed illumination incident upon sensor 104, and/or a demodulator 140 arranged to demodulate a signal encoded into pulsed illumination 112 incident upon sensor 104. It is contemplated that pulse data 106 be received as an electrical signal, issued from a pixel array of sensor 104, and received either wirelessly or via a wired connection between sensor 104 and decoder 114. Based on the electrical signal including pulse data 106, decoder 114 determines frequency/intensity/wavelength and/or demodulates pulse data 106. Demodulating pulse data 106 can include, for example, demodulating a pattern of pulses that object 14 is emitting in the vehicle environment. The pattern of pulses can be, for example, peculiar to a specific type of object—stop signs emitting pulsed illumination with a first pattern and yield signs emitting pulsed illumination with a second pattern differing from the first pattern.

Object identifier 116 is disposed in communication with decoder 114 and lookup table 122 for identifying object 14 using decoded pulse data 124. In this respect object identifier 116 receives decoded pulse data 124 from decoder 114 and communicates decoded pulse data 124 to lookup table 122. Lookup table 122 returns an identity 126 of object 14 to object identifier 116 based on decoded pulse data 124, which object identifier 116 provides to image data enhancer 118. In certain embodiments identity 126 includes indicia, e.g., a symbol, of object 14 for insertion in image data 108.

Lookup table 122 includes a listing of decoded pulsed illumination/object associations. Based on the object associated with decoded pulse data 124, lookup table 122 returns to object identifier 116 an identity 126 corresponding to the decoded pulsed illumination/object association recorded on lookup table 122. It is contemplated that the frequencies can be used for visible light produced by light-emitting-diode (LED) devices, such that those used to generate colors in traffic lights, vehicle indicator lighting, or advisement signage. In an exemplary embodiment the frequency is on the order of about 100 hertz with frequency spacing corresponding to the resolution of decoder 114. For example, traffic control device identities can be associated with frequencies in a first frequency range, vehicle identities can be associated with frequencies in a vehicular object range, and non-traffic control device/non-vehicular identities, e.g., a pedestrian identity, can be associated in a third frequency range.

Image data enhancer 118 is disposed in communication with object identifier 116, and therethrough with decoder 114, for identifying object 14 using decoded pulse data 124 of pulsed illumination 112. Image data enhancer 118 is also disposed in communication with sensor 104 to receive therefrom image data 108, and is configured to enhance image data 108 by inserting identity 126 into image data 108, thereby generating enhanced image data 128. It is contemplated that identity 126 be inserted within image data 108 in spatial registration therein, which is enabled by the dual pulse detection imaging capability provided by sensor 104, thereby simplifying enhancement of image data 108.

Machine vision algorithm 120 is communicative with image data enhancer 118 and is arranged analyze enhanced image data 128. Based on the content of enhanced image data 128, including the presence (or absence) of identity 126, machine vision algorithm 120 generates navigation instructions 130, which machine vision algorithm 120 provides to controller 102 as an electrical signal. In certain embodiments machine vision algorithm 120 may include objection identification modules that identify object in enhanced image data 128 using techniques other than inserting identity into the image data, such as size, shape, or color recognition techniques by way of non-limiting examples. As will be appreciated by those of skill in the art in view of the present disclosure, the use of such supplemental analysis techniques in conjunction with identities placed within enhanced image data 128 reduces error in analyzing image data 108 acquired by sensor 104. It can also harden navigation system 100 against spoofing and/or employment light at tabled frequencies by unassociated devices, for example by requiring that traffic control device indicator be located in proximity to a shape corresponding to the traffic control device.

In certain embodiments, navigation system 100 (or autonomous vehicle 10) can include a user interface 132. User interface 132 is disposed in communication with navigation system 100 and is arranged to receive identity 126 within enhanced image data 128 from navigation system 100. User interface 132 is further arranged to display an image 142 (shown in FIG. 3) of vehicle environment 12 including identity 126 within enhanced image data 128. In certain embodiments, image 142 includes identify 126 in spatial registration within image 142 according the registration of pulsed illumination and non-pulsed illumination received by sensor 104.

Figure 2:
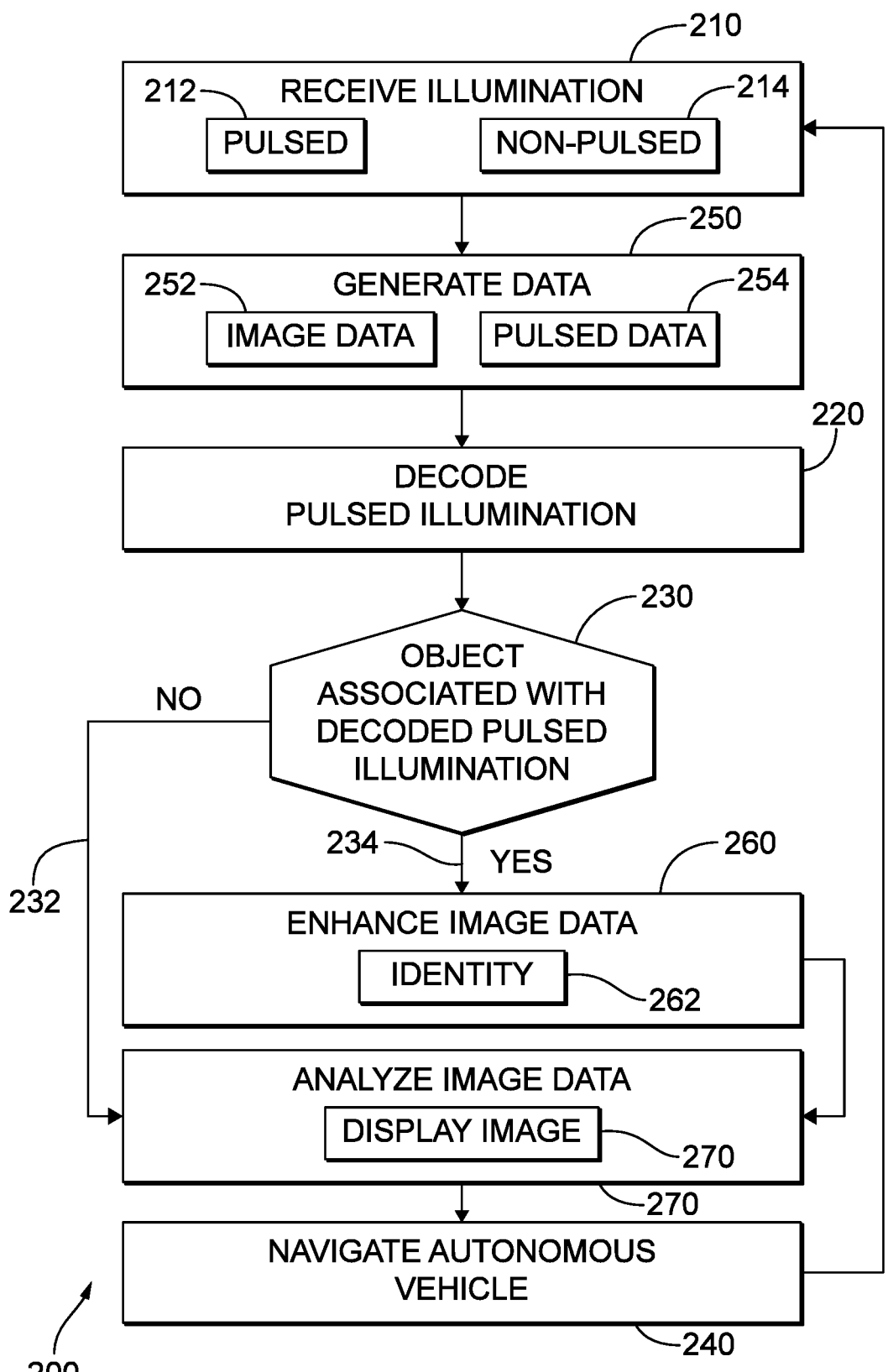
FIG. 2 is a block diagram of a method of navigating an autonomous vehicle, showing steps of the method.

Referring now to FIG. 2, a method 200 of navigating an autonomous vehicle, e.g., autonomous vehicle 10 (shown in FIG. 1), is shown. Method 200 generally includes receiving pulsed illumination from an object located in the vehicle environment, e.g., object 14 (shown in FIG. 1), as shown with box 212. The pulsed illumination is decoded according to one or more of frequency, intensity, wavelength and modulation, as shown with box 220. Based on the decoded pulsed illumination, a determination is made as to whether the object has an identity, e.g., identify 126 (shown in FIG. 1), as shown with box 230. When the object has an identity image data acquired contemporaneously with the pulse data, e.g., image data 108 (shown in FIG. 1) is enhanced with the object identifier, as shown with box 260, and the autonomous vehicle navigated through the vehicle environment based on the identification of the object as shown with box 240.

In certain embodiment method 200 includes receiving both pulsed illumination (as shown with box 212) and receiving non-pulsed illumination (as shown with box 214), as shown with box 210. Data is generated using a common pulse detection and imaging sensor, e.g., sensor 104 (shown in FIG. 1), as shown with box 250. It is contemplated that both image data and pulse data can be generated using the sensor, as shown with boxes 252 and 254. The image data and pulse data can be generated coincidentally using a common sensor array, the pulse data thereby being acquired in spatial registration with the image data. The pulsed and non-pulsed illumination can share a common visible, short-wavelength infrared, a mid-wavelength infrared, or a long-wavelength infrared waveband. It is contemplated that identifying the object can include selecting an identity for the object using the decoded pulsed illumination.

When a determination is made that the decoded pulsed illumination does not contain a parameter, e.g., frequency/intensity/wavelength/modulation, that is associated with an object the image data can be analyzed by a machine vision algorithm, e.g., machine vision algorithm 120 (shown in FIG. 1), as shown with arrow 232. When a determination is made that the pulsed illumination contains a parameter that is associated with an object the image data is enhanced, as shown with arrow 234 and box 260, to generate enhanced image data, e.g., enhanced image data 128 (shown in FIG. 1). Enhancing the image data includes inserting an identity, e.g., identity 126 (shown in FIG. 1), as shows with box 262. The identity, which can be a symbol inserted in spatial registration with the origin of the pulsed illumination within the image data generated by the sensor, corresponds with a pulsed illumination/object identity association resident in a reference, e.g., lookup table 122 (shown in FIG. 1).

The image data, enhanced or unenhanced, is thereafter analyzed, as shown with box 270. Analyzing the enhanced or unenhanced image data can include applying a machine vision algorithm, e.g., machine vision algorithm 120 (shown in FIG. 1). Analyzing the enhanced or unenhanced image data can also include applying a shape, size or color recognition algorithm to the enhanced or unenhanced image data.

Analyzing the enhanced or unenhanced image data can additionally include correlating a shape in proximity to an identity enhancement to reduce likelihood of a false negative or false positive identification of an object and/or to prevent spoofing the navigation system. Optionally, an image 142 (shown in FIG. 3) can be displayed on a display 132 (shown in FIG. 1), as shown with box 272.

Figure 3:
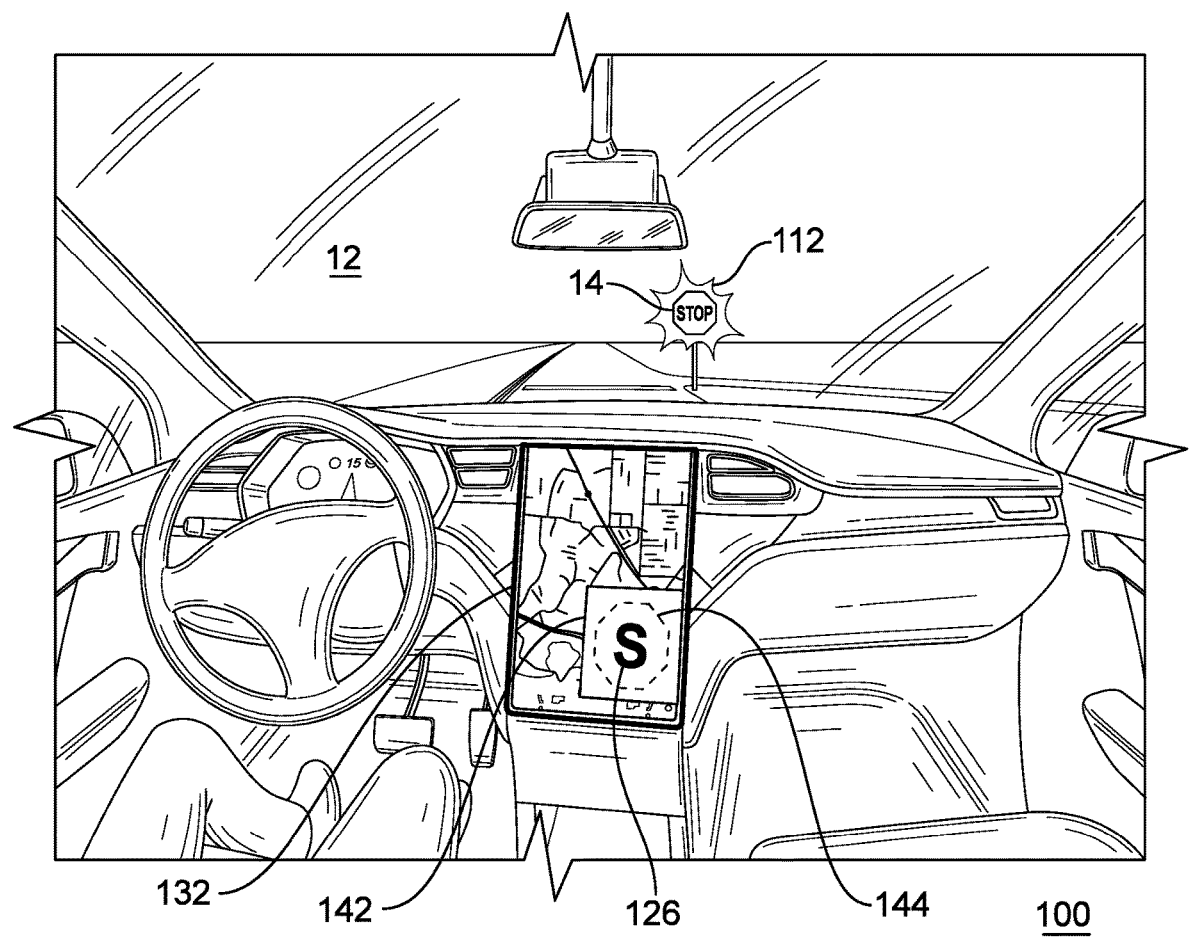
FIG. 3 is a partial view of an autonomous vehicle and vehicle environment, showing an object in the vehicle environment displayed on a user interface with an object identity in the displayed image.

With reference to FIG. 3, an exemplary autonomous vehicle 10 is shown according to an exemplary embodiment. As autonomous vehicle 10 approaches object 14, which is an LED-equipped stop sign, sensor 104 receives pulsed illumination 112 and non-pulsed illumination 114 (shown in FIG. 1) from the vehicle environment 12. Pulsed illumination 112 is unmodulated, pulsing at a frequency characteristic with LED approved for road signed under a certification scheme. Navigation system 100 associates identify 126 with object 14 using method 200 (shown in FIG. 2), and inserts identity 126 into image data 108 (shown in FIG. 1) such that image 142 is generated with identify 126, which are displayed on display 132. Autonomous vehicle 10 thereafter receives navigations instructions 130 (shown in FIG. 1), which in this case implement a braking schedule.

Optionally, navigation system 100 further applies machine vision algorithm 120 to image data 108 to verify an expected shape 144 associated with object 14. The verification may be weighted, for example, based on imaging conditions at the time image data 108 is acquired. For example, a positive identification threshold can be adjusted according to the imaging conditions. In the case of poor imaging condition, navigation system 100 (shown in FIG. 1), will place a higher priority on identity 126 (shown in FIG. 1) than on machine vision algorithm enhancements applied to image data 108 (shown in FIG. 1).

Autonomous vehicle navigation typically requires information regarding the size, shape, color, and/or movement of an object in the vehicle environment to recognize the object. Such information can be acquired passively utilizing light that has reflected off object in the vehicle environment to build an image of the environment, and thereafter apply one or more machine vision algorithms to detect shapes such as street signs, street lights, pedestrians, and other vehicles within the image. The vehicle control algorithm can then make navigation, control, and obstacle avoidance decisions based on the shape information extracted from the image. This can provide acceptable results in good (i.e. unobscured) conditions. Degraded conditions, such as in darkness or during periods of bad weather, can reduce the reliability of such techniques.

In certain embodiments described herein low cost, low power, and high reliability pulsed LED illuminators are employed to enhance navigation system performance. Active illuminators are mounted on street signs, street lights, vehicles, pedestrians, dog collars or vests, and other objects in proximity to roadways. Each class of pulsed LED illuminator (source) pulses at a unique frequency or range of frequencies. For example, stop sign LED illuminators may pulse at around 100 hertz, yield signs pulse at around 110 hertz, merge signs pulse at about 120 hertz, etc., such that a vehicle-mounted pulse detector and imaging array senses the pulsed illumination frequency associated with the object as well as the spatial location of the object relative to the autonomous vehicle.

For example, when an autonomous vehicle encounters a stop sign object it generally must rely upon image data (e.g., size, shape, color, movement) alone to recognize the stop sign object. In poor imaging conditions, such as low-light or bad weather, the vehicle's ability to detect and identify the stop sign can be degraded, increasing the likelihood of false-negatives. In certain embodiments described herein, pulsed illumination sources integrated into the stop sign object emitting pulsed illumination the direction of traffic allow autonomous vehicle 10 (shown in FIG. 1) to detect the presence and location of pulsed illuminators using navigation system 100 (shown in FIG. 1). Navigation system 100 will decode the frequency of the pulsed illuminators, recognizing that 100 hertz pulsed illumination is associated with stop sign objects, and provide image enhanced with a stop sign object identity to the navigation system machine vision algorithm—increasing the likelihood that the machine vision algorithm recognizes the stop sign in the vehicle environment. This can be done to augment object recognition techniques that are based on shape, size, color, and/or movement in order to enhance the detection and recognition of objects such as street signs. It is contemplated that frequency/object associations can be extended to other static objects, such as traffic lights, as well as mobile objects such as pedestrians, bicycles, dog/cat collars, and other vehicles.

Although described in terms of one-way communication between an autonomous vehicle and a stationary object, it is to be understood and appreciated that pulsed illumination sources can be located on vehicles to provide one-way and two-way communication between vehicles. For example, a vehicle can indicate intended maneuvers to other vehicles in the vicinity of the a. Whereas standard brake lights initiate at the same time that breaking begins, an autonomous vehicle can initiate a deceleration countdown by ramping the frequency of pulsed illumination sources leading up to the actual application of vehicle breaks. Surrounding vehicles can acknowledge receipt of the message. Notably, the communication includes the spatial location of the vehicle or other object with which the autonomous vehicle is communicating.

The methods and systems of the present disclosure, as described above and shown in the drawings, provide for navigation systems and method for navigating autonomous vehicles with superior properties including reduced rates of false negatives and/or false positives of objects in the vehicle environment. While the apparatus and methods of the subject disclosure have been shown and described with reference to preferred embodiments, those skilled in the art will readily appreciate that change and/or modifications may be made thereto without departing from the scope of the subject disclosure.

What is claimed is:

1. A method of navigating an autonomous vehicle, comprising:
   receiving pulsed illumination from an object in the vehicle environment;
   generating pulse data from the pulsed illumination;
   decoding the pulse data;
   identifying the object using the decoded pulsed illumination;
   receiving non-pulsed illumination from the vehicle environment;
   generating image data of the vehicle environment using the non-pulsed illumination, wherein the image data is generated coincidentally with the pulse data; and
   navigating the autonomous vehicle through the vehicle environment based on the identification of the object.

2. The method as recited in claim 1, wherein the pulsed and non-pulsed illumination share a visible, short-wavelength infrared, a mid-wavelength infrared, or long-wavelength infrared band and wherein the image data is further generated in spatial registration with the pulse data.

3. The method as recited in claim 1, further comprising enhancing the image data by inserting an identity associated with the pulsed data into the image data.

4. The method as recited in claim 1, further comprising applying a shape recognition algorithm to the image data.

5. The method as recited in claim 1, further comprising analyzing the image data with a machine vision algorithm, wherein the image data is enhanced with an object identity.

6. The method as recited in claim 1, wherein identifying the object includes selecting an identity for the object using frequency of the pulsed illumination.

7. The method as recited in claim 1, wherein navigating the autonomous vehicle through the vehicle environment includes issuing a navigation command to vehicle controller based on an analysis of image data containing the object identity.

8. The method as recited in claim 1, wherein the non-pulsed illumination and pulsed illumination are acquired by a single sensor.

9. A method of controlling an autonomous vehicle, comprising:
receiving non-pulsed illumination from the vehicle environment;
generating image data of the vehicle environment using the non-pulsed illumination;
receiving pulsed illumination from an object in the vehicle environment, wherein the pulsed illumination and non-pulsed illumination are in a common visible, short-wavelength infrared, a mid-wavelength infrared, or long-wavelength infrared waveband;
generating pulse data from the pulsed illumination, wherein the image data is generated coincidentally with the pulse data;
decoding the pulse data;
identifying the object using frequency of the decoded pulsed illumination, wherein identifying the object includes selecting an identity associated with the object based on the decoded pulsed illumination;
enhancing the image data by inserting the object identity into the image data;
analyzing the enhanced image data with a machine vision algorithm; and
navigating the autonomous vehicle through the vehicle environment based on the identification of the object.

10. The method as recited in claim 9, wherein the non-pulsed illumination and pulsed illumination are acquired by a single sensor.

11. A navigation system for navigating an autonomous vehicle through an external vehicle environment having objects external to the autonomous vehicle, comprising:
a sensor for receiving pulsed illumination from the object the in vehicle environment and generating pulse data and for receiving non-pulsed illumination from the vehicle environment and generating image data, wherein the image data is generated coincidentally with the pulse data;
a decoder in communication with the sensor for decoding the pulse data;
an object identifier in communication with the decoder for identifying the object using the decoded pulsed illumination; and
a controller in communication with the object identifier and operatively connected to the autonomous vehicle for navigating the autonomous vehicle through the vehicle environment based on the identification of the object.

12. The navigation system as recited in claim 11, wherein the sensor is a pulse detector imaging sensor configured to generate the pulse data and the image data from incident illumination received from the external environment, wherein the image data is generated in spatial registration with the pulse data.

13. The navigation system as recited in claim 11, wherein the incident illumination is in a visible waveband, a short-wavelength-infrared waveband, a mid-wavelength infrared waveband, and a long-wavelength waveband.

14. The navigation system as recited in claim 11, further comprising a lookup table having a plurality of decoded pulsed illumination/object identity associations, wherein the object identifier is disposed in communication with the lookup table.

15. The navigation system as recited in claim 14, wherein the decoded pulse data object identity associations include one or more decoded pulse data/traffic control device association, decoded pulse data/vehicle association, and decoded pulse data/non-traffic control device and vehicle association.

16. The navigation system as recited in claim 11, further comprising a machine vision algorithm in communication with the object identifier and is configured to generate navigation commands based on object identity.

17. The navigation system as recited in claim 16, further comprising an image data enhancer in communication with the sensor, the object identifier, and the machine vision algorithm, wherein the enhancer is arranged to enhance image data received from the sensor with one or more object identity received from the object identifier and provide the enhanced image data to the machine vision algorithm.

18. The navigation system as recited in claim 16, further comprising an image data enhancer in communication with the sensor, the object identifier, and the machine vision algorithm, wherein the enhancer is arranged to enhance the image data received form the sensor with one or more object identity received from the object identifier and provide the enhanced image data to a user interface.

19. The navigation system as recited in claim 11, wherein the sensor is a single sensor.

* * * * *